(12) United States Patent
Kim

(10) Patent No.: US 6,992,268 B2
(45) Date of Patent: Jan. 31, 2006

(54) STEAM OVEN HAVING AN INNER CASING INCLUDING A VACUUM

(75) Inventor: Hyung Min Kim, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/893,920

(22) Filed: Jul. 20, 2004

(65) Prior Publication Data

US 2005/0121433 A1    Jun. 9, 2005

(30) Foreign Application Priority Data

Dec. 9, 2003    (KR) .................... 10-2003-0089138

(51) Int. Cl.
*A21B 1/24*    (2006.01)
*F27D 1/00*    (2006.01)
*F27D 1/12*    (2006.01)
*F24C 15/34*    (2006.01)

(52) U.S. Cl. .................. 219/401; 126/20; 219/391; 219/408

(58) Field of Classification Search ................ 219/400, 219/401, 391, 408; 126/19 R, 20–21 A
See application file for complete search history.

(56) References Cited

U.S. PATENT DOCUMENTS

| 5,442,161 A | * | 8/1995 | Matsushima ................ 219/756 |
| 6,038,830 A | * | 3/2000 | Hirath et al. .............. 52/788.1 |
| 6,408,841 B1 | * | 6/2002 | Hirath et al. ............. 126/19 R |

FOREIGN PATENT DOCUMENTS

| DE | 19520040 A1 | * | 12/1996 |
| FR | 2628179 A | * | 9/1989 |
| JP | 7-243653 | | 9/1995 |
| JP | 2000257878 A | * | 9/2000 |
| JP | 2001201058 A | * | 7/2001 |

* cited by examiner

*Primary Examiner*—Joseph Pelham
(74) *Attorney, Agent, or Firm*—Staas & Halsey LLP

(57) ABSTRACT

A steam oven including an outer casing to define an appearance of the steam oven, an inner casing provided in the outer casing to define a cooking cavity to cook food therein. The inner casing includes an inner wall and an outer wall, with a space defined between the inner wall and the outer wall and maintained in a vacuum state, thus insulating the cooking cavity from an outside of the inner casing. The steam oven further includes a steam generator to supply steam into the inner casing. Therefore, the steam oven accomplishes the desired insulating effect without using any insulating material while the space defined between the inner wall and the outer wall reduces conductive and convective heat transfer.

23 Claims, 4 Drawing Sheets

STEAM OVEN HAVING AN INNER CASING INCLUDING A VACUUM

CROSS-REFERENCE TO RELATED APPLICATIONS

This application claims the benefit of Korean Patent Application No. 2003-89138, filed Dec. 9, 2003 in the Korean Intellectual Property Office, the disclosure of which is incorporated herein by reference.

BACKGROUND OF THE INVENTION

1. Field of the Invention

The present invention relates, in general, to steam ovens and, more particularly, to a steam oven which accomplishes a desired insulating effect for a cooking cavity without using any insulating material.

2. Description of the Related Art

Generally, steam ovens are cooking apparatuses used to cook foods with the heat of steam generated therein.

Conventional steam ovens include an outer casing to define an appearance thereof, an inner casing, which is provided in the outer casing, to define a cooking cavity therein, and a steam generator to supply steam into the cooking cavity. Therefore, the conventional steam ovens cook foods with heat of steam which is supplied from the steam generator into the cooking cavity defined by the inner casing.

In the above-mentioned conventional steam ovens, the interior of the inner casing is heated by the steam to a relatively high temperature. Therefore, to increase thermal efficiency and to prevent safety hazards caused by the hot steam, the conventional steam ovens must include an insulating material, which is provided between the inner casing and the outer casing, to prevent heat energy in the inner casing from leaking to the outside of the inner casing.

However, because the conventional steam ovens must cook food with the hot steam in the inner casing of the steam oven, the conventional steam ovens cannot use a material, such as a plastic material, as the insulating material.

SUMMARY OF THE INVENTION

Accordingly, it is an aspect of the present invention to provide a steam oven which accomplishes a desired insulating effect for a cooking cavity without using any insulating material.

The above and/or other aspects are achieved by providing a steam oven, including an outer casing to define an appearance of the steam oven, and an inner casing provided in the outer casing to define a cooking cavity to cook food therein. The inner casing includes an inner wall and an outer wall. A space is defined between the inner wall and the outer wall of the inner casing and is maintained in a vacuum state, to insulate the cooking cavity from an outside of the inner casing. The steam oven further includes a steam generator to supply steam into the inner casing.

Each of the inner wall and the outer wall of the inner casing may be coupled by a welding process to a front panel defining a front of the outer casing to maintain the space between the inner wall and the outer wall of the inner casing in the vacuum state.

The steam oven may further include a seal made of an elastic material. The seal is provided between front ends of both the inner wall and the outer wall of the inner casing and an inner surface of a front panel, which defines a front of the outer casing, to seal junctions between the front ends of both the inner wall and the outer wall of the inner casing and the inner surface of the front panel, and to maintain the space between the inner wall and the outer wall of the inner casing in the vacuum state.

The steam oven may further include a flange extending from the front end of each of the inner wall and the outer wall of the inner casing to correspond to the inner surface of the front panel of the outer casing, and a fastener mounted to the front panel of the outer casing while passing through the front panel to fasten the flange of each of the inner wall and the outer wall of the inner casing to the front panel, with the seal elastically deformed between the flanges of both the inner wall and the outer wall of the inner casing and the inner surface of the front panel by the fastener.

The steam generator may include a steam generating vessel of which an outlet is connected to and communicates with the cooking cavity, with a predetermined amount of water contained in the steam generating vessel, and a first heater to generate steam. The first heater is installed in the steam generating vessel to be immersed in the water contained in the steam generating vessel. The steam generator may further include a second heater mounted to an upper portion in the steam generating vessel to overheat the steam generated by the first heater.

The above and/or other aspects are achieved by providing a steam oven, including an outer casing to define an appearance of the steam oven, an inner casing provided in the outer casing to define a cooking cavity to cook food therein, with a vacuum layer provided in an interior of a wall defining the inner casing to be maintained in a vacuum state, and a steam generator to supply steam into the inner casing.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
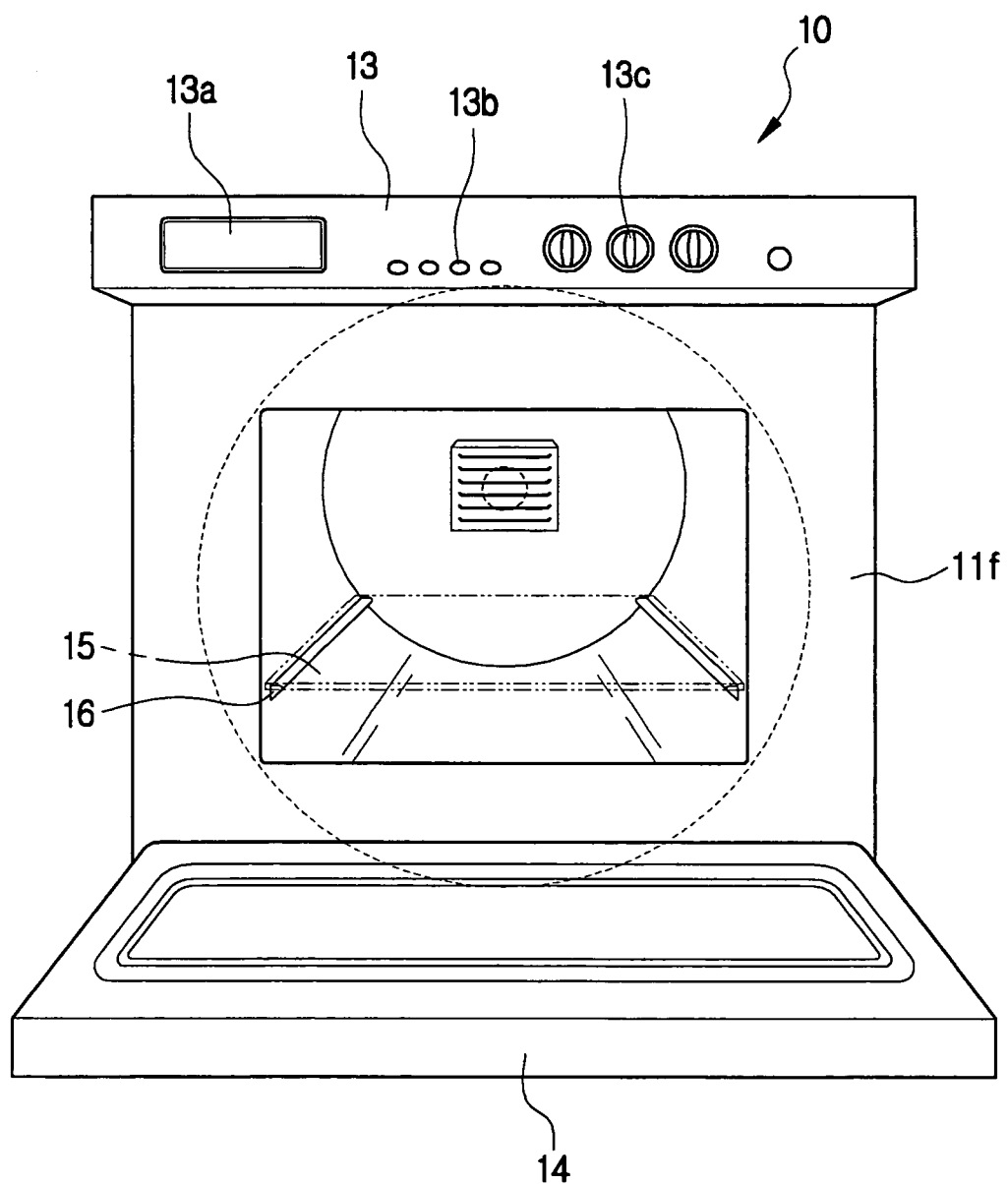
FIG. 1 is a front perspective view of a steam oven, according to a first embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
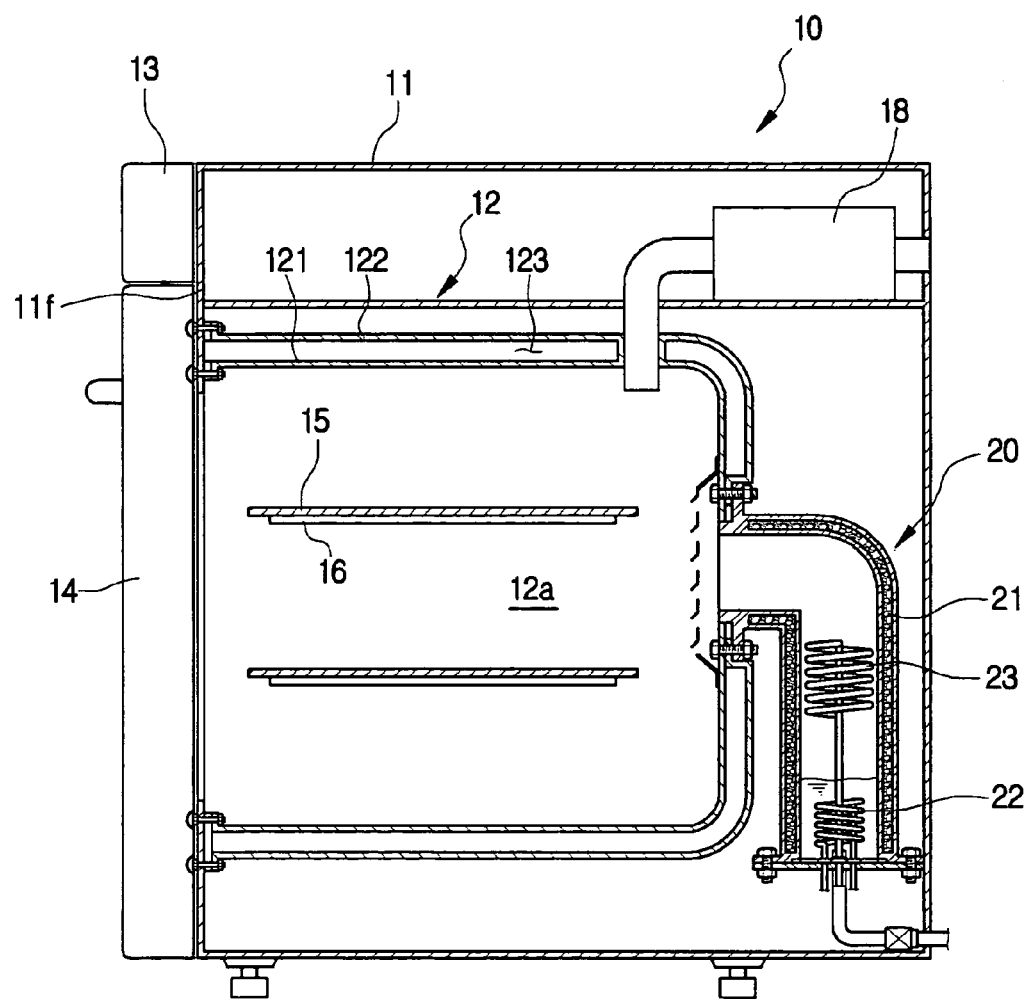
FIG. 2 is a sectional view showing an internal construction of the steam oven of FIG. 1.

As shown in FIGS. 1 and 2, a steam oven according to a first embodiment of the present invention includes a cabinet 10 which defines an appearance of the steam oven and defines a cooking cavity 12a therein, thus cooking food in the cooking cavity 12a. The steam oven further includes a steam generator 20 to supply overheated steam into the cooking cavity 12a.

The cabinet 10 includes an outer casing 11 and an inner casing 12. The inner casing 12 is installed in the outer casing 11 and is separated from the outer casing 11 to define the cooking cavity 12a therein. The steam oven further includes a control panel 13 which is provided on an upper portion of a front of the cabinet 10. The control panel 13 includes a display 13a to display an operational state of the steam oven thereon, various kinds of control buttons 13b, and control switches 13c.

The outer casing 11 and the inner casing 12 are opened at fronts thereof so as to place and remove food into and from the cooking cavity 12a. The steam oven further includes a door 14 which is coupled at a lower end thereof to a lower portion of the front of the cabinet 10 by a hinge joint. Thus, the door 14 is opened downward and closed upward at the open front of the cooking cavity 12a. In the steam oven according to the first embodiment, the inner casing 12 has a cylindrical shape, and the open front of the outer casing 11 has a rectangular shape.

The steam oven further includes a rack 15, which is provided in the cooking cavity 12a, to support food thereon. Guide rails 16 are oppositely provided on both sidewalls of the cooking cavity 12a to respectively support opposite edges of the rack 15, so that the rack 15 is ejected from or retracted into the cooking cavity 12a along the guide rails 16.

During operation, the steam generator 20 includes a steam generating vessel 21 which contains a predetermined amount of water therein, a first heater 22 which is installed in the steam generating vessel 21 to boil the water, and a second heater 23 which is mounted to an upper portion in the steam generating vessel 21 to overheat the steam generated by the first heater 22. Overheated steam is generated by allowing the second heater 23 mounted to the upper portion in the steam generating vessel 21 to further heat the steam generated by an operation of the first heater 22 while the steam rises toward the upper portion in the steam generating vessel 21. In the drawings, the reference numeral 18 denotes an exhaust duct to discharge the overheated steam from the cooking cavity 12a to an outside of the cooking cavity 12a.

The inner casing 12 includes an inner wall 121 and an outer wall 122 which are separated from each other. A vacuum layer 123, which is provided between the inner wall 121 and the outer wall 122, maintains a vacuum state of the space between the inner wall 121 and the outer wall 122. The vacuum layer 123 prevents conductive or convective heat transfer between the inner wall 121 and the outer wall 122, so that the heat energy in the inner casing 12 is prevented from leaking to the outside of the inner casing 12. Thus, thermal efficiency of the steam oven is increased, and users of the steam oven are protected from safety hazards which may be caused by the overheated steam.

Figure 3:
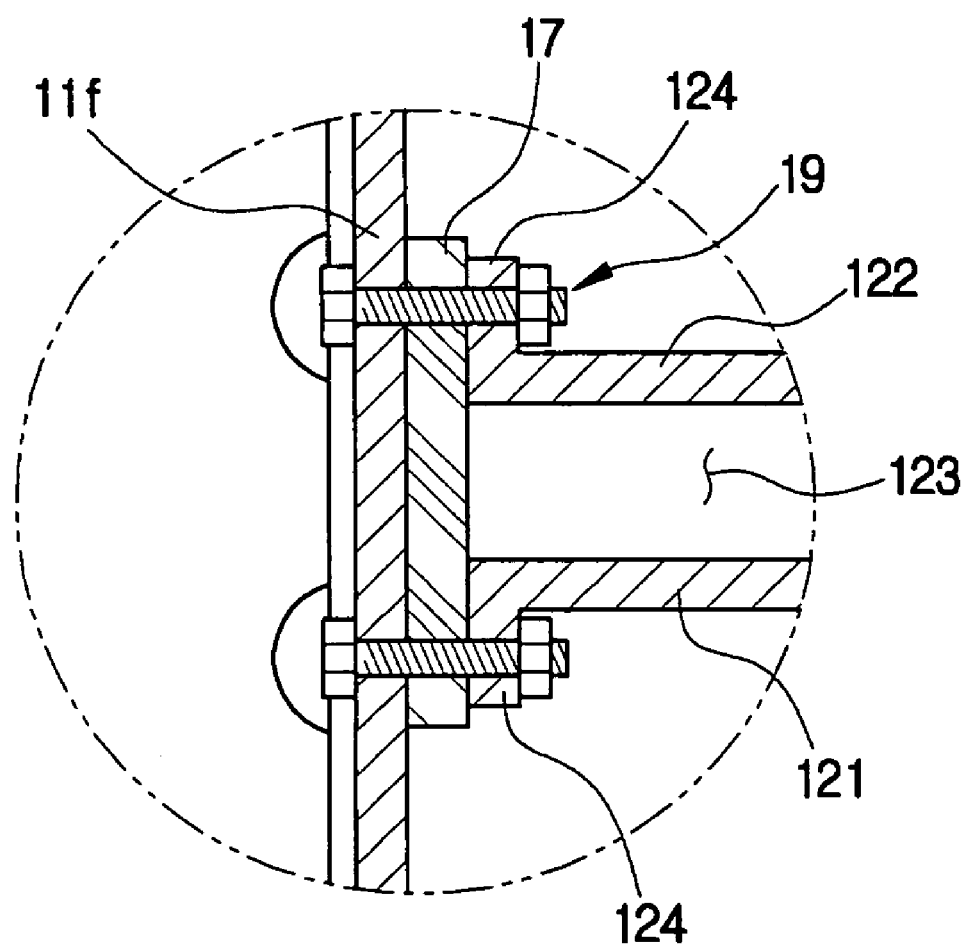
FIG. 3 is a partially enlarged sectional view showing a junction structure between a front panel of an outer casing and front end of an inner casing in the steam oven of FIG. 1.

Furthermore, a front end of each of the inner wall 121 and the outer wall 122 of the inner casing 12 is coupled in an airtight manner to a front panel 11f defining the front of the outer casing 11. The junction between the front wall 121 and the outer wall 122 is airtight so that the vacuum layer 123 is maintained in the vacuum state. As shown in FIG. 3, the steam oven according to the first embodiment further includes a seal 17 which is made of an elastic material, such as rubber, and is interposed between the front ends of both the inner wall 121 and the outer wall 122 and an inner surface of the front panel 11f. The seal 17 is in close contact with the front ends of both the inner wall 121 and the outer wall 122, so that the vacuum layer 123 between the inner wall 121 and the outer wall 122 is maintained in the vacuum state.

A flange 124 allows the seal 17 to remain in close contact with the front ends of both the inner wall 121 and the outer wall 122. The flange 124 extends from the front end of each of the inner wall 121 and the outer wall 122 to be parallel with the inner surface of the front panel 11f of the outer casing 11. A fastener 19, such as a bolt and a nut, is mounted to the front panel 11f of the outer casing 11 while passing through the front panel 11f to fasten the flange 124 of each of the inner wall 121 and the outer wall 122 to the front panel 11f. The seal 17 is elastically deformed between the flanges 124 of both the inner wall 121 and the outer wall 122 and the inner surface of the front panel 11f.

Figure 4:
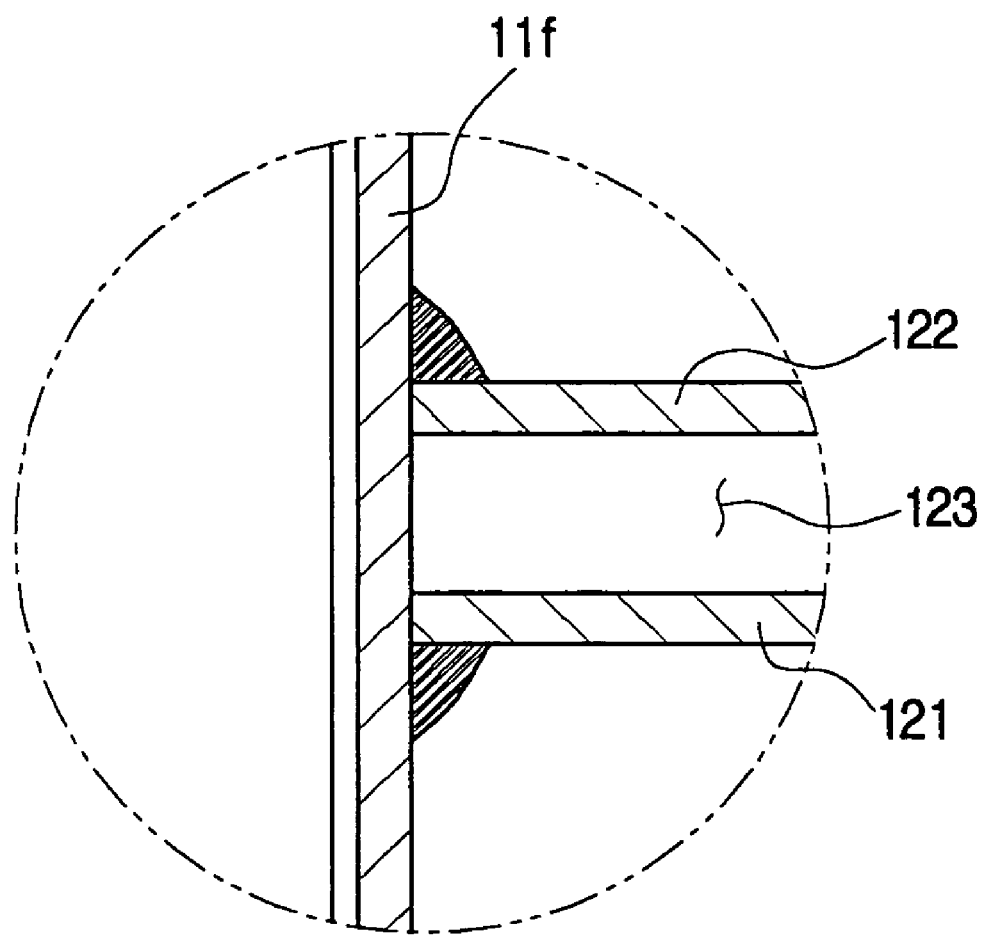
FIG. 4 is a view corresponding to FIG. 3, but showing a second embodiment of the present invention.

In the steam oven according to the first embodiment, the front end of each of the inner wall 121 and the outer wall 122 of the inner casing 12 is airtightly coupled to the front panel 11f of the outer casing 11, with the seal 17 interposed between the front ends of both the inner wall 121 and the outer wall 122 and the front panel 11f. However, in a steam oven according a second embodiment of the present invention, as shown in FIG. 4, the front end of each of the inner wall 121 and the outer wall 122 of the inner casing 12 may be coupled in an airtight manner by a welding process to the front panel 11f of the outer casing 11.

According to a second embodiment of the invention, the inner casing 12 includes the inner wall 121 and the outer wall 122, with the vacuum layer 123 defined between the inner wall 121 and the outer wall 122. However, without being limited to the embodiments of the present invention, the vacuum layer may be provided in the interior of the wall defining the inner casing 12 through a variety of methods.

The operation and effect of the steam oven of the present invention will be described herein below.

First, foods are placed on the rack 15 of the cooking cavity 12a. Thereafter, the steam oven is operated to generate an overheated steam in the steam generating vessel 21. To generate the overheated steam, the water, contained in the steam generating vessel 21, is heated by the first heater 22. The steam created by the heat of the first heater 22 is then overheated by the second heater 23 of the steam generator 20. To achieve this effect, the first heater 22 immersed in the water to boil the water generates steam, and the second heater 23 further heats the steam while the steam rises toward the upper portion in the steam generating vessel 21 to overheat the steam.

Thereafter, the overheated steam is supplied into the cooking cavity 12a, so that the foods are heated and cooked by the overheated steam in the cooking cavity 12a. After cooking is finished, the overheated steam is discharged to the outside of the cooking cavity 12a through the exhaust duct 18 which is provided at the upper portion of the cooking cavity 12a.

The interior of the cooking cavity 12a is maintained in the high temperature state with the overheated steam while the foods are cooked in the cooking cavity 12a by the above-mentioned cooking process. The vacuum layer 123, which is provided between the inner wall 121 and the outer wall 122, prevents conductive or convective heat transfer between the inner wall 121 and the outer wall 122.

As is apparent from the above description, a steam oven according to the present invention has an inner casing of which an inner wall and an outer wall are placed to be spaced apart from each other, with a vacuum layer defined between the inner wall and the outer wall to be maintained in a vacuum state. Therefore, the steam oven achieves a desired insulating effect of the cooking cavity without using any insulating material while the vacuum layer prevents conductive and convective heat transfer from the cooking cavity to the outside.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A steam oven, comprising:
    an outer casing to define an appearance of the steam oven;
    an inner casing, provided in the outer casing to define a cooking cavity therein, including an inner wall and an outer wall, with an empty space defined between the inner wall and the outer wall which is maintained as a vacuum, to insulate the cooking cavity from an outside of the inner casing; and
    a steam generator between the outer casing and the inner casing to supply steam into the inner casing.

2. The steam oven according to claim 1, further comprising a front panel defining a front of the outer casing, wherein each of the inner wall and the outer wall of the inner casing is coupled by a welding process to the front panel to maintain the vacuum in the space between the inner wall and the outer wall of the inner casing.

3. The steam oven according to claim 1, further comprising:
    an inner surface of a front panel defining a front of the outer casing; and
    a seal, made of an elastic material, between front ends of both the inner wall and the outer wall of the inner casing and the inner surface of the front panel to seal junctions between the front ends of both the inner wall and the outer wall of the inner casing and the inner surface of the front panel, and to maintain the vacuum in the space between the inner wall and the outer wall of the inner casing.

4. The steam oven according to claim 3, further comprising:
    a flange extending from the front end of each of the inner wall and the outer wall of the inner casing to correspond to the inner surface of the front panel of the outer casing; and
    a fastener mounted to the front panel of the outer casing while passing through the front panel to fasten the flange of each of the inner wall and the outer wall of the inner casing to the front panel, with the seal elastically deformed between the flanges of both the inner wall and the outer wall of the inner casing and the inner surface of the front panel by the fastener.

5. The steam oven according to claim 1, wherein the steam generator comprises:
    a steam generating vessel having an outlet connected to and communicating with the cooking cavity, and a predetermined amount of water contained therein;
    a first heater installed in the steam generating vessel to be immersed in the water contained in the steam generating vessel to generate steam; and
    a second heater mounted to an upper portion in the steam generating vessel to overheat the steam generated by the first heater.

6. A steam oven, comprising:
    an outer casing to define an appearance of the steam oven;
    an inner casing in the outer casing to define a cooking cavity to cook food therein, with an empty vacuum layer provided in an interior of a wall defining the inner casing; and
    a steam generator between the outer casing and the inner casing to supply steam into the inner casing.

7. A steam oven, comprising an inner casing having a cooking cavity to cook food therein an outer casing, and a steam source external to the inner casing, the inner casing, including an inner wall and an outer wall, with an empty vacuum maintained between the inner and the outer walls to insulate the cooking cavity from an outside of the inner casing, including the outer casing.

8. The steam oven according to claim 7, further comprising:
    a front panel in a front of the outer casing, wherein the inner wall and the outer wall of the inner casing are coupled to the front panel and separated from each other.

9. The steam oven according to claim 8, further comprising:
    an inner surface of the front panel; and
    an elastic seal between front ends of both the inner wall and the outer wall of the inner casing and the inner surface of the front panel to seal a junction between the front ends of both the inner wall and the outer wall of the inner casing and the inner surface of the front panel.

10. The steam oven according to claim 9, further comprising:
    a flange to extend from the front end of each of the inner wall and the outer wall of the inner casing to be parallel with the front panel; and
    a fastener to fasten each flange to the front panel, respectively, with the seal elastically deformed between the flanges.

11. The steam oven according to claim 7, further comprising a steam generator to supply steam to the steam oven, wherein the steam generator comprises:
    a steam generating vessel having an outlet connected to and communicating with the cooking cavity, with a predetermined amount of water contained therein;
    a first heater, to generate steam, installed in the steam generating vessel; and
    a second heater to overheat the steam generated by the first heater.

12. A steam oven, comprising:
    an inner casing having a cooking cavity to cook food therein, including an inner wall and an outer wall, with an empty space defined between the inner and outer walls, which is maintained as a vacuum, to insulate the cooking cavity from an outside of the inner casing; and
    a steam generator between the outer casing and the inner casing to supply steam to the cooking cavity.

13. A sealing apparatus to maintain a vacuum in a casing of a steam oven, comprising:
    an inner casing having a front opening including an inner wall and an outer wall separated from each other;
    a front panel to border the front opening;
    a seal between each of the inner wall and the outer wall and the front panel to maintain an empty vacuum between the inner wall and the outer wall;
    an outer casing; and
    a steam generator between the outer casing and the inner casing.

14. The sealing apparatus according to claim 13, wherein the seal is made of an elastic material.

15. The sealing apparatus according to claim 14, wherein the seal comprises a flange to extend from a front end of each of the inner wall and the outer wall to be parallel with the front panel.

16. The sealing apparatus according to claim 15, wherein a fastener fastens the flange to the front panel with the seal elastically deformed between the flange and the front panel.

17. A steam oven, comprising:
an outer casing to define an appearance of the steam oven;
an inner casing, provided in the outer casing to define a cooking cavity therein, including an inner wall and an outer wall, with a space defined between the inner wall and the outer wall which is maintained as a vacuum, to insulate the cooking cavity from an outside of the inner casing;
a steam generator to supply steam into the inner casing;
an inner surface of a front panel defining a front of the outer casing; and
a seal, made of an elastic material, between front ends of both the inner wall and the outer wall of the inner casing and the inner surface of the front panel to seal junctions between the front ends of both the inner wall and the outer wall of the inner casing and the inner surface of the front panel, and to maintain the vacuum in the space between the inner wall and the outer wall of the inner casing.

18. The steam oven according to claim 17, further comprising:
a flange extending from the front end of each of the inner wall and the outer wall of the inner casing to correspond to the inner surface of the front panel of the outer casing; and
a fastener mounted to the front panel of the outer casing while passing through the front panel to fasten the flange of each of the inner wall and the outer wall of the inner casing to the front panel, with the seal elastically deformed between the flanges of both the inner wall and the outer wall of the inner casing and the inner surface of the front panel by the fastener.

19. A steam oven, comprising:
an inner casing having a cooking cavity to cook food therein, including an inner wall and an outer wall of the casing, with a vacuum maintained between the inner and the outer walls to insulate the cooking cavity from an outside of the inner casing;
an outer casing;
a front panel in a front of the outer casing, wherein the inner wall and the outer wall of the inner casing are coupled to the front panel and separated from each other;
an inner surface of the front panel; and
an elastic seal between front ends of both the inner wall and the outer wall of the inner casing and the inner surface of the front panel to seal a junction between the front ends of both the inner wall and the outer wall of the inner casing and the inner surface of the front panel.

20. The steam oven according to claim 19, further comprising:
a flange to extend from the front end of each of the inner wall and the outer wall of the inner casing to be parallel with the front panel; and
a fastener to fasten each flange to the front panel, respectively, with the seal elastically deformed between the flanges.

21. A sealing apparatus to maintain a vacuum in a casing of a steam oven, comprising:
an inner casing having a front opening including an inner wall and an outer wall separated from each other;
a front panel to border the front opening; and
a seal between each of the inner wall and the outer wall and the front panel to maintain a vacuum between the inner wall and the outer wall,
wherein the seal is made of an elastic material.

22. The sealing apparatus according to claim 21, wherein the seal comprises a flange to extend from a front end of each of the inner wall and the outer wall to be parallel with the front panel.

23. The sealing apparatus according to claim 22, wherein a fastener fastens the flange to the front panel with the seal elastically deformed between the flange and the front panel.

* * * * *

UNITED STATES PATENT AND TRADEMARK OFFICE
CERTIFICATE OF CORRECTION

PATENT NO. : 6,992,268 B2  
APPLICATION NO. : 10/893920  
DATED : January 31, 2006  
INVENTOR(S) : Hyung Min Kim Page 1 of 1

It is certified that error appears in the above-identified patent and that said Letters Patent is hereby corrected as shown below:

Column 6, line 8, Claim 7, replace "therein" with --therein,--, therefor;

Column 6, line 9, Claim 7, replace "casing" with --casing,--, therefor.

Signed and Sealed this

Eleventh Day of July, 2006

JON W. DUDAS  
*Director of the United States Patent and Trademark Office*